United States Patent [19]

Meyers

[11] E Re. 30,068

[45] Reissued Aug. 7, 1979

[54] PULSATING TORQUE APPARATUS AND METHOD

[75] Inventor: Theodore F. Meyers, Troy, Ohio

[73] Assignee: Hobart Corporation, Troy, Ohio

[21] Appl. No.: 876,195

[22] Filed: Feb. 8, 1978

Related U.S. Patent Documents

Reissue of:

[64] Patent No.: 3,970,907
Issued: Jul. 20, 1976
Appl. No.: 461,638
Filed: Apr. 17, 1974

[51] Int. Cl.[2] ..... H02P 1/42

[52] U.S. Cl. ..... 318/744; 318/762; 318/114; 318/115; 318/124; 318/125; 318/128; 318/754

[58] Field of Search ..... 318/114, 115, 124, 125, 318/128, 129, 207 R, 207 C, 211, 212, 220 R, 441

[56] References Cited

U.S. PATENT DOCUMENTS

| | | | |
|---|---|---|---|
| 2,740,932 | 4/1956 | King | 318/212 X |
| 2,811,316 | 10/1957 | Ewing | 318/207 C |
| 2,851,646 | 9/1958 | Williamson et al. | 318/207 C |
| 3,401,892 | 9/1968 | Meyers | 318/207 C |
| 3,675,100 | 7/1972 | McNamara et al. | 318/220 R |

FOREIGN PATENT DOCUMENTS

| | | |
|---|---|---|
| 587525 | 10/1933 | Fed. Rep. of Germany . |
| 127620 | 9/1928 | Switzerland . |
| 897963 | 6/1962 | United Kingdom . |

*Primary Examiner*—Gene Z. Rubinson
*Attorney, Agent, or Firm*—Biebel, French & Nauman

[57] ABSTRACT

An electrical apparatus producing pulsating high torque rotational vibration movement combined with a slow superimposed unidirectional rotary motion is disclosed. The apparatus includes an alternating current motor combined in a mechanically resonatable system with electrical apparatus producing a non-alterating component of magnetic flux in the motor structure. The torque generating ability of the motor is increased approximately five-fold even though the motor is operated from the same supply voltage. The disclosed apparatus is illustrated connected to a waste disposer device.

32 Claims, 9 Drawing Figures

PULSATING TORQUE APPARATUS AND METHOD

Matter enclosed in heavy brackets [ ] appears in the original patent but forms no part of this reissue specification; matter printed in italics indicates the additions made by reissue.

BACKGROUND OF THE INVENTION

In many applications of an electric motor, it is common for the motor to suddenly encounter a mechanical load which is beyond its torque producing capability. This condition necessitates the incorporation of some external apparatus for either removing a portion of the motor load, terminating operation of the motor or in some way increasing the torque applied to the load. In some motor uses it is possible to store mechanical energy for use in these high torque situations by coupling such devices as flywheels or spring mechanisms to the motor or its load. In other motor uses it is necessary to provide a motor having torque output which is in excess of that normally required by the load in order that the expected but infrequent need for increased torque be accommodated. Each of these solutions obviously has undesirable features.

Although many examples of motor loads which involve a sudden imposition of high load torque are to be found, it is likely that none of these examples equals the torque needed when unusual raw materials are introduced into a stationary machine of the crushing and grinding type. The absence of stored kinetic energy or flywheel effect and the impossibility of impacting engagement between the raw material and the working member of the machine in this situation profoundly increases the torque required of the driving motor; indeed the presence of a flywheel would actually detract from the ability of the motor to process the raw material in such cases since the torque required to accelerate the flywheel would add to the torque required for working the unusual raw material.

Frequently encountered examples of crushing and grinding equipment which are subject to this type of load include hammer mills, rock crushers, tree limb choppers, wood hogs and waste disposers. The waste disposer machine is a particularly exacting example of a sudden high torque motor load since popular demand for these machines necessitates that they have small physical size, low initial cost, long unattended operating life and comminuted material output which is limited to small particle sizes.

Despite the increasing acceptance of waste disposer equipment as a desirable element of kitchen operations, no single disposer design has been forthcoming to fully satisfy these desired properties. In particular, the need for long trouble-free operating life, small output particle size, low cost, and small physical dimensions appear to almost mutually exclude one another and necessitate design compromise in machines built according to presently available technology. An example of this compromise is to be found in the trade-off between output particle size, long unattended operating life and low original cost, since it is found that disposers having small clearance between operating members (as is required to produce small output particle size) are also most subject to jamming so as to need professional maintenance attention. The low initial cost requirement, of course, precludes the use of a driving motor having excessively large reserve torque capability.

The present invention relates to an apparatus and method by which a waste disposer, a crushing and grinding apparatus, or other motor driven machine can better meet the above requirements. In particular, the present invention relates to apparatus for increasing the torque produced by an alternating current motor and changing this torque into a pulsating form which has been found particularly suited to overcoming the jamming problems encountered in crushing and grinding equipment.

DESCRIPTION OF THE PRIOR ART

A series of patents including U.S. Pat. No. 3,349,307 issued to Joseph P. Licata et al., on Oct. 24, 1967; U.S. Pat. No. 3,576,483, issued to Charles C. Gambill on Apr. 27, 1971; and U.S. Pat. No. 3,576,484, also issued to Charles C. Gambill on Apr. 27, 1971, discloses a family of alternating current motor speed control arrangements having electrical circuitry somewhat similar to that used in the present apparatus.

In each of the above mentioned patents, the alternating current motor is of the type commonly used for small fans, phonographs, and other low starting torque loads. The motor wiring circuit in each of these patents includes a small continuous duty capacitor element connected in series with one motor winding. In motors of this type the series capacitor element usually has an electrical size in the order of one to ten microfarads and provides starting winding current which, although small in magnitude, is shifted sufficiently in phase with respect to the main winding current to generate motor starting torque and slightly increase motor running torque. In these prior art devices, a Silicon Controlled Rectifier (SCR) and series resistance element are employed to vary the running speed of the motor. In these devices the rectifier and resistance element produce no increase in motor torque and in fact produce a braking torque which decreases the torque the motor can provide to a connected load.

BRIEF SUMMARY OF THE INVENTION

In the present invention there is provided apparatus for use with alternating current squirrel cage rotor motors for providing exceptionally large torque, repetitive rotational vibrations which are accompanied by a unidirectional component of rotation. The resulting motor rotor movement may be employed for example, in freeing the motor rotor or its associated load from a mechanically-jammed condition. The invention also includes selectively actuatable elements for modifying the current flow in the motor windings in order that either normal or modulated rotor torque and rotor movement can be achieved.

DESCRIPTION OF THE PREFERRED EMBODIMENTS

Figure 1:
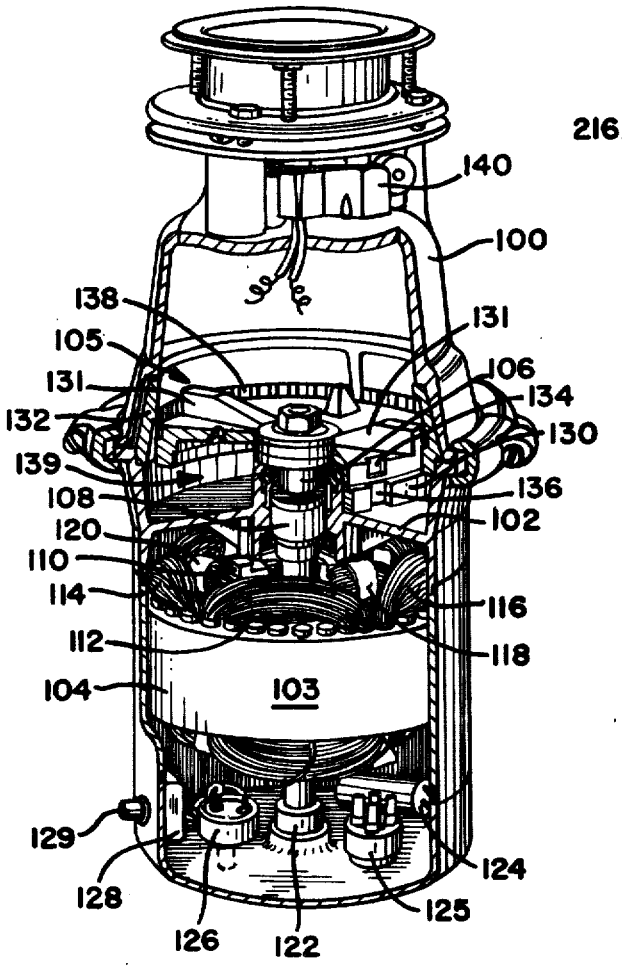
FIG. 1 is an overall view of a waste disposer apparatus incorporating an alternating current motor which may include pulsating torque apparatus made in accordance with the present invention.

In FIG. 1 of the drawings, there is shown a waste disposer which is typical of devices that may employ a pulsating torque apparatus made in accordance with the present invention as a source of rotational power. The waste disposer in FIG. 1 includes a housing 100 which contains in the lower portion an alternating current motor having distributed stator poles and a squirrel cage rotor. The upper portion of the housing 100 contains a waste pulverizing apparatus 105 which is separated from the motor 103 by a divider 102.

The motor 103 consists of a stator structure 104, a rotor 110, a shaft 106, an upper bearing and liquid seal structure 108, a lower bearing mount 122 and a plurality of electrical windings 112, 114, 116, 118 and 120.

The waste pulverizing apparatus 105 includes a cutter wheel 130, a shredder ring 132 and a drain structure located between the cutter wheel 130 and divider 102, and not shown in FIG. 1. The waste disposer in FIG. 1 is of the type which includes a series of cutting elements in the form of shredder ring teeth 138. These teeth cooperate with a series of indentations and accompanying teeth 134 and 136 located in the periphery of the cutter wheel 130.

The waste disposer also includes a power switch 140 which may be magnetically actuated by the act of inserting a closure member into the mouth of the disposer. Alternatively, the power switch may be a manually actuated external switch. Also included in the housing 100 is a starting capacitor 124, a starting-reversing relay 125, a thermal overload protector 126 and a jam-breaking switch 128 which is shown with an operating portion 129 protruding through the housing 100 for manual actuation as required in one embodiment of the invention.

In operating the disposer, refuse material is fed with a flow of water into the mouth of the housing 100 and falls onto the cutter wheel 130 where it is broken into small pieces by the beating action of vanes 131. The broken material is subsequently thrown against the shredder ring 132 by centrifugal force and thereafter falls and is flushed downwardly into the confined region between shredder ring teeth 138 and cutter wheel indentations 134 and 136 where combined shearing, shredding and crushing action occurs. After passing through the confined space between the cutter wheel and the shredder ring teeth, the waste material falls or is carried by water into an evacuation chamber 139 and is subsequently conveyed therefrom into a drain connection. Additional details regarding disposer operation and general configuration are to be found in U.S. Pat. No. 2,657,297, dated Nov. 3, 1953 and issued to John Drew, U.S. Pat. No. 2,946,525 issued July 26, 1960 to Charles Thierer and in U.S. Pat. No. 3,401,892 issued Sept. 17, 1968 to Theodore F. Meyers.

The thermal overload protector 126 safeguards the windings of the motor 103 from excessive temperatures which could result from prolonged overload of the disposer. The jam-breaking switch 128, the starting-reversing relay 125 and the starting capacitor 124 function during certain disposer operating conditions as described below.

In the course of operating waste disposer devices, it is, as previously indicated, not unusual to encounter a jammed condition wherein particles or a mass of refuse material has become statically wedged between the stationary shredder ring and cutter wheel. In many instances removal of such particles or mass is not possible by ordinary electrical or mechanical means and dismantling of the disposer may be required. In particular, it has been found that small metallic particles such as "BB" shot pellets, nails, hairpins, and other metallic objects are especially capable of producing difficult jammed conditions.

It is also found that the materials ordinarily placed in a disposer can easily produce a jammed condition, if introduced while the rotor is in the static condition. If the space between disposer cutter wheel 130 and shredder ring 132 in FIG. 1 is filled with, for example, bone chips and corn husk remnants it is likely that prior art disposers will be unable to free themselves and commence rotation.

The static jam condition is particularly difficult in a disposer because stored kinetic energy is not available for use in comminuting the jamming material, because there is no impacting action between the rotor and the jamming material and, because in prior art disposers, adequate torque is not available solely from the motor to accomplish comminution of the jamming material. This low torque condition is particularly true while the motor is in the start-up condition.

Figure 2:
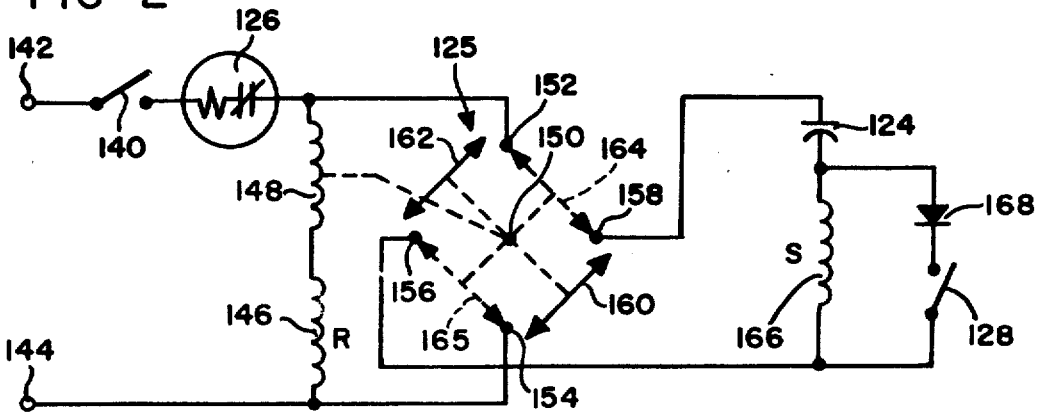
FIG. 2 is an electrical circuit diagram which can be employed with a motor of the type shown in FIG. 1.

In FIG. 2 of the drawings there is shown an electrical schematic diagram of apparatus which may be employed with a motor of the type shown in FIG. 1 to achieve improved jam-breaking capability. The apparatus of FIG. 2 includes a pair of terminals 142 and 144 which connect to a source of alternating current energy, a power switch 140, a thermal overload protector 126 which incorporates both a series resistance element and a heat responsive set of normally-closed contacts, a starting-reversing relay 125 having an armature 150 and a series current responsive coil 148, a motor run winding 146, a motor start winding 166, a starting capacitor 124, a rectifier 168 and a jam-breaking switch 128. Both the jam-breaking switch 128 and the power switch 140 are of the normally-open type. Each may be either manually operated or automatic in response to some other function of the disposer. For example, switch 128 may be responsive to a signal indicating the detection of a jam in the disposer.

The starting-reversing relay 125 provides a reverse direction of rotation for the cutter wheel 130 each time the motor is started as is described in the previously-mentioned U.S. Pat. No. 3,401,892. This method of disposer starting has been found to be reliable and to provide some jam-breaking capability. This, of course, requires that teeth 134 and 138 cut in both directions of rotation of cutter wheel 130. In accordance with this starting method, the contacts 160 and 162 of the starting-reversing relay 125 are normally in the open condition, as shown in FIG. 2. These contacts are closed by a moving plunger as discussed in one of the above patents when the relay coil 148 is energized by current flowing in the motor run winding 146. In the closed condition, movable contact 162 provides a current path between line contact 152 and winding contact 156 while movable contact 160 provides a current path between the line contact 154 and winding contact 158. These two current paths will be maintained so long as current in the run winding 146 is of sufficient amplitude in response to the motor operating at a velocity below normal running speed, that is, so long as the motor rotor is stalled or being accelerated from the stationary condition. Once the motor rotor approaches normal running speed, current in the run winding 146 and the relay coil 148 diminishes to a value which allows movable contacts 160 and 162 to fall away from stationary contacts 152, 156, 154 and 158 and thereby remove the start winding 166 from the circuit.

The capacitor 124 is a starting capacitor and causes current flowing in the start winding 166 to be displaced in time phase with respect to the current flowing in the run winding 146 for the purpose of producing a rotating magnetic field capable of accelerating the rotor 110 from the static rest condition.

Once the motor electrical circuit is opened by switch 126 as a result of a jammed condition or as a result of the operator opening power switch 140, the next energization of the circuit will place the starting-reversing relay movable contacts 160 and 162 in the alternate positions 164 and 165 and thereby cause the phase relationship between currents in the run winding 146 and the start winding 166 to be reversed. This will, of course, reverse the direction of rotation of the rotor 110 from that of the previous starting and thereby tend to dislodge material which might be jammed between the cutter wheel 130 and the shredder ring 132.

The jam-breaking sequence which results from the operation of power switch 140 or thermal overload protector 126 is not a complete answer to a disposer jam since this sequence either requires prolonged operator intervention or alternately occurs at a relatively slow rate. The torque available for correcting a jammed condition in this sequence is also limited to the normal starting torque of the motor and may be insufficient for many jam conditions, so that jams beyond the capability of this arrangement may be encountered.

The jam-breaking capability of the FIG. 1 and FIG. 2 apparatus is increased by adding the electrical switch 128 and the rectifier 168 to the disposer circuit.

Closure of the jam-breaking switch 128 alters the FIG. 2 electrical circuit in two respects. The first of these alterations results in no energy being supplied to the start winding 166 in the half-cycle of the energizing alternating current wherein the contact 158 is positive with respect to the contact 156. That is, during the half-cycle wherein rectifier 168 is conducting, zero voltage appears across the start winding 166. During this half-cycle the full line voltage is impressed across capacitor 124 and the topmost electrode of this capacitor receives a positive charge with respect to the bottom-most electrode.

Closure of the jam-breaking switch 128 also alters the function of the FIG. 2 circuit during the half-cycle wherein contact 156 is positive with respect to contact 158 and the rectifier 168 is in the non-conducting condition. During this half-cycle, there is impressed across the start winding 166, the sum of the voltage across supply terminals 142 and 144 and the voltage stored in capacitor 124 during the previous half-cycle.

The capacitor 124 in FIG. 2 may be of the normally-employed motor starting capacitor type. With the rectifier 168 connected in the FIG. 2 circuit, the normally-employed starting capacitor which will be of several hundred microfarads electrical size is capable of supplying stored energy to the motor winding through an appreciable portion of the power line half-cycle wherein rectifier 168 is in the non-conducting state.

The shunting of start winding 166 by rectifier 168 during one-half of the alternating current cycle has the electrical effect of energizing the start winding of the FIG. 2 motor with pulsating direct current. The performance characteristics of an alternating current motor which is excited in this manner with direct current in one stator winding and alternating current in another stator winding are found to depart sharply from the characteristics such a motor displays when excited by alternating current in all stator windings. These performance characteristics are found to be especially useful in freeing the motor or its associated load from a jammed condition since they involve an oscillatory movement of the motor rotor, increased motor torque, resonant mechanical energy exchange and sufficient unidirectional torque to urge the motor rotor and its load into continuing contact with the jamming object.

Figure 3:
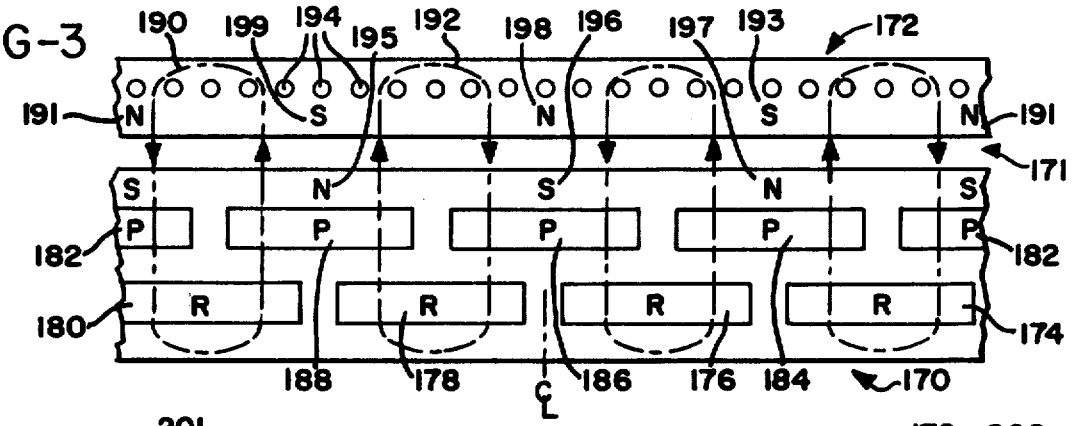
FIGS. 3 and 4 are flat representations of an alternating current electric motor which are useful in describing apparatus made in accordance with the present invention.
Figure 4:
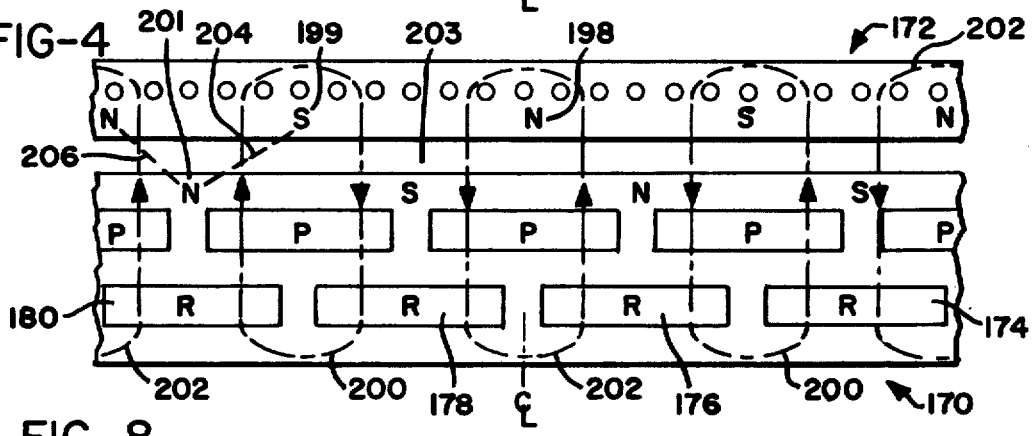

One possible explanation for the characteristics exhibited by an alternating current motor excited with both alternating and direct currents in the stator windings is shown in FIG. 3 and FIG. 4 of the drawings.

In FIG. 3 there is shown a four-pole alternating current motor such as could be employed with the disposer of FIG. 1. In this view, both the motor rotor and stator members are shown in a flat, linear developed view to schematically illustrate the windings and magnetic flux paths of the motor. The start windings in these views are identified by the letter "P" as phase windings, in order that the letter "S" may designate south magnetic poles; the phase windings are shown at 182, 184, 186 and 188. The phase windings are mounted on a stator structure 170 and are alternately arranged with the run windings 174, 176, 178 and 180 in the manner which is known in the alternating current motor art. The rotor 172 is shown to contain a plurality of rotor windings or conductors 194 which are, of course, electrically short-circuited and which are coupled with the stator windings by magnetic flux which flows in a series of closed paths as indicated at 190 and 192. These closed paths include portions which lie in the stator structure 170, the rotor structure 172 and the air gap 171.

FIG. 3 describes the conditions established in an alternating current motor when D.C. exciting current is applied to the phase winding in accordance with the circuit diagram of FIG. 2 and when no current is applied to the run windings. As a result of the direct current flowing in phase windings 182–188, a magnetic pole of one polarity is established at 196 in the stator and similar but opposite magnetic poles are established at 197 and 195. All three of the windings 184, 186 and 188, cooperate in forming the magnetic pole at 196 with the windings 186 and 188 contributing jointly to the flux flowing in the path 192 and with similar flux resulting from cooperation between each other pair of windings. The magnetic flux producing the pole 196 which is labeled a South magnetic pole "S", also produces a North magnetic pole "N" in the rotor 172 as shown at 198. As shown at 195 and 199, similar but opposite magnetic poles are also generated at the center of each of the phase windings 182, 184, 186 and 188.

As a result of inductive energy storage, the magnetic poles established in rotor 172 do not decay instantly upon removal of excitation from the stator windings or upon displacement of the relative position between rotor 172 and stator 170 by rotor movement, but instead persist for a finite period of time following such acts. In the usual alternating current motor, this persistence of an established rotor magnetic pole is generally regarded to have a time constant near six alternating current cycles. Since this persistence at least exceeds the duration of a single alternating current cycle, the constant polarity rotor poles in FIG. 1 are acted upon by a plurality of stator magnetic flux states generated by the alternating current flowing in the motor run windings. This action is described in FIG. 4 in the drawings.

In FIG. 4, the stator 170 and the rotor 172 are shown in the same physical position as in FIG. 3. In FIG. 4 the run windings such as windings 174, 176, 178 and 180 cooperate to produce the magnetic flux indicated by the paths 200, 202, etc. Since the current applied to the motor run windings is alternating in nature, at some time instant in the cycle of this current, the flux generated by the windings 178 and 180 will have the polarity for generating the stator poles indicated at 201 and 203. The rotor magnetic poles 198 and 199 which were described in FIG. 3 are sustained by magnetic inductance energy storage for a time exceeding one cycle of the applied alternating current. These rotor poles exist at the same time as the poles 201 and 203 and are acted upon by the poles 201 and 203. Since the stator poles 201 and 203 alternate in magnetic polarity with respect to the longer duration rotor poles 198 and 199, the forces between stator and rotor poles will also alternate and will become, during one alternation, forces of attraction and during the other alternation forces of repulsion. These forces between stator and rotor poles are indicated in FIG. 4 by the lines 204 and 206 and are, because of the polarities involved, forces of attraction and repulsion, respectively. As a result of repulsion along the line 206 and attraction along the line 204, and similar action between each of the rotor and stator pole pairs, the net force on the rotor 172 tends to move the rotor structure toward the left as shown in FIG. 4.

The current applied to run windings 178 and 180 in FIG. 4 will have opposite polarity during a subsequent alternation of the applied power, hence the stator pole 201 wll also have an opposite polarity and will become South magnetic pole. The presence of a South magnetic pole at 201 in FIG. 4 will result in a repulsion force along line 204 between stator pole 201 and rotor pole 199, simultaneously, the force along line 206 becomes a force of attraction. Under these conditions the rotor 172 is urged to move toward the right in FIG. 4. Alternate movement of the rotor 172 to the right and to the left in FIG. 4 in response to polarity changes of the alternating current energy applied to the motor run windings provides a rotational vibration or pulsating torque which urges the cutter wheel 130 in the FIG. 1 disposer into repeated impacting, cutting and crushing engagement with a jamming object and tends to dislodge a jamming mass from the space between the cutter wheel and the shredder ring.

It is of course possible to interchange the roles of rotor and stator in the FIG. 3 and FIG. 4 descriptions without departing from the spirit of the invention. In such an interchanged arrangement of the motor, the phase and run windings are located on the movable or rotor member and are connected to the energy source etc. by way of slip rings or other rotationally free apparatus. The alternate attracting and repelling function described in FIG. 4 can of course occur regardless of which of the illustrated structures is designated rotor and which is called stator.

The characteristics of an alternating current motor which is excited with both direct and alternating current in the stator windings may also be considered to result from the rotor having only alternating poles which are induced across the motor air-gap by alternating current flowing in the stator run windings in the manner which is normal for a squirrel cage alternating current motor. In accordance with this prospect the alternating current rotor poles are acted upon by direct current poles established in the motor stator, by direct current flowing in the motor start windings, with the interaction of AC rotor poles and the combined AC-DC stator poles producing the expected pulsating rotor torque.

In the FIGS. 3 and 4 description of motor operation, so long as the rotor poles 198 and 199 remain of uniform strength, the rotor 172 will move alternately to the right and to the left with equal accelerations and velocities in response to the stator pole alternations. In this condition there would be no unidirectional component of torque tending to produce rotor movement in one direction and hence there would be no continuing engagement of the cutter wheel 130 in FIG. 1 with a jamming object.

The constant strength direct current pole condition would of course result from exciting the motor start winding 166 in FIG. 2 with pure direct current. When the start winding is not excited with pure direct current but instead conducts DC current having a ripple or superimposed alternating component, as is the case with the FIG. 2 rectifier and capacitor circuit, the direct current poles in the stator and possibly in the rotor are not of constant strength. The pulsating torque produced by these poles of varying strength is not precisely equal in both rotational directions. This unequal opposite direction pulsating torques produces a small unidirectional component of motor torque which tends to rotate the rotor essentially in one direction during the time the switch 128 in FIG. 2 is closed.

This unidirectional component of torque in a one-half horsepower capacitor-start disposer motor is found to be of relatively low magnitude, a magnitude sufficiently low to permit successful manual restraint of the rotor during operation. This unidirectional component of torque is found to be sufficiently large to urge a waste disposer cutter wheel into repeated "slack absorbing" contact with a jamming object as the object disintegrates. Thus, the presence of this essentially unidirectional torque is very desirable when the present invention AC-DC excitation of an alternating current motor is applied to a waste disposer.

The unidirectional component of torque described above is found to drive the motor rotor at a no-load velocity which is significantly below normal operating speed. In the case of the one-half horsepower squirrel-cage disposer motor, this unloaded operating speed is approximately 93 RPM in contrast with the 1750 RPM normal operating speed.

A portion of the unidirectional torque or the difference between rotor torques in opposite rotating directions of the motor may be attributed to magnetic saturation and small differences in the quantity of magnetic flux in rotor and stator members in alternate polarity directions; such differences as may be produced by nonsymmetrical operation of parts of the motor structure about an operating point on a BH curve.

Regardless of the manner in which the pulsating torque from simultaneous AC and DC excitation of an AC motor is produced, and irrespective of the lower unloaded velocity of a motor operated in this manner, the torque generated by an alternating current motor in this mode of operation is found to exceed that which the motor would produce with normal alternating current excitation by a significant margin. In the case of a one-half horsepower single phase capacitor-start motor, for example, the locked rotor torque is normally in the neighborhood of 40 ounce-feet. When the same motor is energized with alternating current in one stator winding and direct current in the other winding, in accordance with circuit of FIG. 2, the torque, of course, becomes pulsating or alternating in nature and reaches peak amplitudes near 200 ounce-feet.

The fivefold increase in motor torque 40 to 200 ounce-feet is believed related to the rotor having some velocity as opposed to being rigidly locked in position; that is, once the initial pulsating torque produced by the interaction of rotor and stator poles produces some rotor movement, a velocity-related field is induced into the rotor and this field increases the available torque. Under these conditions, for at least some portion of a jam-breaking cycle, the motor rotor and the disposer cutter wheel are subjected to both increasing velocity and increasing torque.

The fivefold increase in motor torque is also believed to be at least partially attributable to a favorable phase relationship between rotor and stator currents. Since one set of the torque-producing magnetic poles (poles in the motor rotor for example) is produced by direct current with the simultaneous AC and DC stator excitation and these poles are almost constant in nature, these poles are present throughout the sinusoidal fluctuation of the other set of torque-producing poles (poles in the stator for example). The torque produced by such a constant pole is not diminished by the sine or cosine trigonometric function usually involved to account for time related variation of pole strength in an alternating current motor.

In addition to this significantly larger torque produced with simultaneous DC and AC excitation of an alternating current motor, the pulsating or oscillating nature of this torque can combine with resilient and mechanical energy storing elements in the motor, the motor load, and the motor-to-load mechanical connection to provide resonant movement of the motor load member.

In the FIG. 1 waste disposer apparatus, for example, it is found that the combined phenomenon of a pulsating motor torque, the rotational inertia of the rotor 110 and the cutter wheel 130, torsional deflection of the shaft 106, the resilience of the disintegrating jamming object and possibly even resilience in the magnetic coupling between rotor 110 and stator structure 104 all combine to provide a system which displays mechanical resonance characteristics during operation. This resonance, of course, involves the mechanical exchange of energy between rotationally vibrating inertia masses, i.e., rotor 110 and cutter wheel 130, and the resilient parts of the system, i.e., resilience in the motor magnetic coupling, resilient jamming material and the resilience of the motor shaft.

Resonant vibration of the cutter wheel 130 appears to become most pronounced as a jamming condition becomes partially loosened. This resonance takes the form of a large increase in cutter wheel rotational vibration amplitude when the system is "tuned" by gradual relaxing of the jam-imposed restraint on the cutter wheel. It would, of course, be possible to select the resilient properties and rotational inertias of a waste disposer or other load imposed on the pulsating torque alternating current motor to provide resonance at any desired combination of pulse excitation frequency and jam restraint conditions desired.

Figure 9:
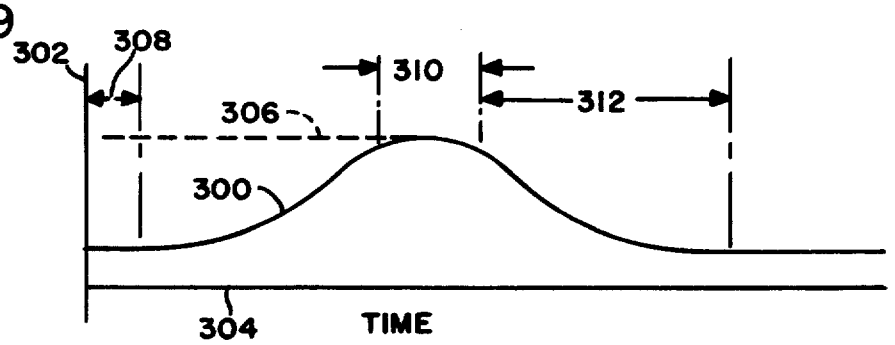
FIG. 9 is a diagram describing the rotational vibration displacement of a load driven by a pulsating torque motor apparatus.

FIG. 9 in the drawings illustrates the effect of resonance on rotational displacement of the cutting wheel 130 in the disposer of FIG. 1. In FIG. 9, the vertical axis 302 represents cutter wheel displacement amplitude, the horizontal axis 304 represents time commencing with the application of power to a tightly-jammed disposer and the curve 300 defines the relationship between displacement and time as the motor rotor and cutter wheel vibrate through successively larger and then diminishing arcs of vibration during a jam-releasing event. Immediately after power is applied to a pulsating torque motor that is connected to a jammed disposer cutter wheel, the rotational displacement of the motor rotor and cutter wheel will be severely limited by the jammed state of the cutter wheel. This condition is illustrated by the low displacement region 308 of FIG. 9. As the jammed condition begins to loosen under the influence of repeated impact from the rotational vibration of the cutter wheel, the rotational displacement of the motor rotor and cutter wheel increases with each successive rotational swing. Simultaneously during this same period, disintegration of the jamming object tunes the system successively closer to the point of resonance until finally a time of peak displacement amplitude occurs as shown in the region 310 of FIG. 9. As the jamming object continues to disintegrate, tuning of the system also continues until the point of maximum resonance and peak amplitude is passed and the rotational displacement of the motor rotor and cutter wheel begins to decrease as is illustrated in the region 312 of FIG. 9. The peak displacement amplitude of the motor rotor and cutter wheel occurs in the region 310 and is designated by the number 306, FIG. 9. This peak displacement amplitude is limited in a practical system by the energy absorbing or damping mechanisms which are inherent in the jamming object, the driving motor, and the motor to cutter wheel coupling apparatus.

It is desirable for the frequency at which the motor is excited to fall between a first resonant frequency of the rotor and load combination while in the jammed or restrained condition and a second resonant frequency of the rotor and load combination in the unjammed or free condition. This arrangement of frequencies assures that the rotor and load will pass through a large displacement-amplitude resonant condition in going from the jammed to the non-jammed condition. The rotational inertia and resilient elements of the disposer apparatus shown in FIG. 1 are found to provide this arrangement of frequencies when excited from a conventional 60 cycle AC power line in accordance with the FIG. 2 circuit.

Returning again to the circuit of FIG. 2 and the disposer of FIG. 1, when the jam-breaking switch 128 is closed during a motor start cycle, it causes the motor to move in the described pulsing, stepping or vibrating manner. If, however, the switch 128 is closed after the motor has attained normal running speed and hence after the contacts of the starting-reversing relay 125 are open, the only noticeable effect on motor operation is a slight increase in operating sound level and a small diminishing of output torque as a result of current being magnetically induced in the start winding 166 and flowing in the rectifier 168. Induced current flowing in start winding 166 and rectifier 168, although tending to brake the motor, is not sufficient in magnitude to stall the motor or slow its rotation appreciably once normal rotating speed is achieved.

Figure 5:
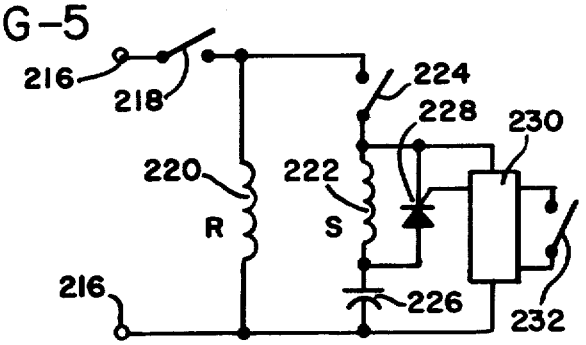
FIG. 5 is an electrical circuit diagram of a motor control apparatus which is in accordance with the present invention.

In FIG. 5 of the drawings there is shown a modified version of the FIG. 2 circuit. The FIG. 5 circuit is comprised of a pair of terminals 216 which are connected to a source of alternating current energy, a pair of motor windings 220 and 222, winding 220 being a run winding, and winding 222 being a start winding, a power switch 218, a start winding disconnect switch 224, a silicon controlled rectifier 228 and a silicon controlled rectifier triggering circuit 230, the triggering circuit 230 including a switch 232.

The FIG. 5 circuit functions in the manner described for the FIG. 2 circuit with the exception that in FIG. 5 the means for actuating switch 224 is not shown, it being contemplated that this switch is operated in response to the rotational velocity of the motor as, for example, by a centrifugal device or by a device which senses the motor winding current.

The silicon controlled rectifier 228 is used in FIG. 5 in lieu of the rectifier 168 which was shown in FIG. 2. When the silicon controlled rectifier 228 is triggered to conduct over a substantial portion of the alternating current half cycle, its electrical characteristics are substantially the same as those of the rectifier 168 in FIG. 2 and therefore the rotor of the FIG. 5 motor will be subjected to torque having pulsations and a small unidirectional component as was described for the motor associated with the FIG. 2 circuit. The portion of the alternating current cycle over which the silicon controlled rectifier 228 conducts is determined by the trigger circuit 230 which may, for example, contain a unijunction transistor, an energy storage capacitor, and a transformer for coupling signals between the unijunction transistor and the gate electrode of the silicon controlled rectifier 228. Silicon controlled rectifier triggering circuits are well known in the electronic circuit art and are extensively described in a series of handbooks published by the General Electric Company.

For embodiments of the present invention wherein the magnitude of the pulsating torque must be limited as for example where the motor structure or motor load are incapable of withstanding large pulsating torques without damage, the conducting angle of the silicon controlled rectifier 228 can be retarded by the triggering circuit 230 so that conduction occurs only during a small portion of the alternating current cycle. The smaller the portion of the alternating cycle over which the silicon controlled rectifier 228 conducts, the more closely will the performance of the motor resemble normal operating mode of an alternating current motor. The switch 232 in FIG. 5 corresponds with the switch 128 in the FIG. 2 circuit diagram and is used to determine whether the FIG. 5 motor operates in the normal mode or in the pulsating torque mode. When the switch 232 is in the normal mode position, triggering of the silicon controlled rectifier 228 is inhibited.

Figure 6:
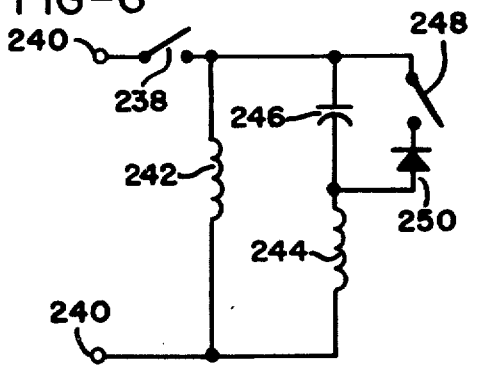
FIGS. 6, 7 and 8 are electrical circuit diagrams of other forms of motor control apparatus according to the present invention.

Another modification of the FIG. 2 circuit is shown in FIG. 6 of the drawings. The FIG. 6 drawing includes a pair of power terminals 240, a power switch 238, a pair of motor windings 242 and 244, a motor starting capacitor 246, a rectifier 250 and a switch 248.

In the FIG. 6 circuit the rectifier 250 is shown connected across the capacitor 246 in lieu of across the winding 244 in the manner shown in FIG. 2. Connection of rectifier 250 across the motor starting capacitor as shown in FIG. 6 has been found to provide a reduced amount of pulsating torque in comparison with the circuit arrangement shown in FIG. 2. This decreased torque is in part provided by the absence of the condition in FIG. 6 wherein voltage stored across capacitor 246 adds to voltage applied at terminals 240 in providing the high voltage unidirectional pulse which is developed by the FIG. 2 circuit.

Figure 7:
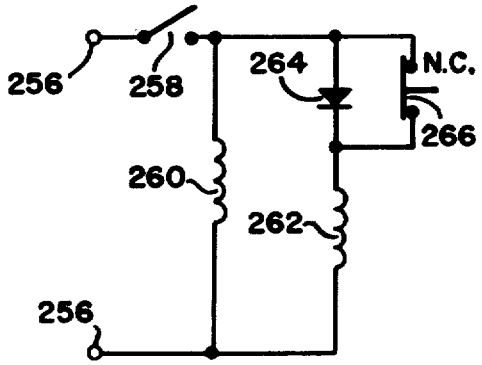

In FIG. 7 of the drawing there is shown yet another modification of the FIG. 2 circuit. The FIG. 7 circuit is comprised of a pair of terminals 256, a power switch 258, a pair of motor windings 260 and 262, a rectifier 264 and a normally closed switch 266. In the FIG. 7 circuit, the rectifier 264 is introduced directly in series with one of the motor windings 262 when the switch 266 is in the open position. Since the FIG. 7 circuit does not provide the high voltage pulse of the series capacitor arrangement in FIG. 2, the torque performance of the FIG. 7 motor is less desirable than that of the FIG. 2 motor.

Figure 8:
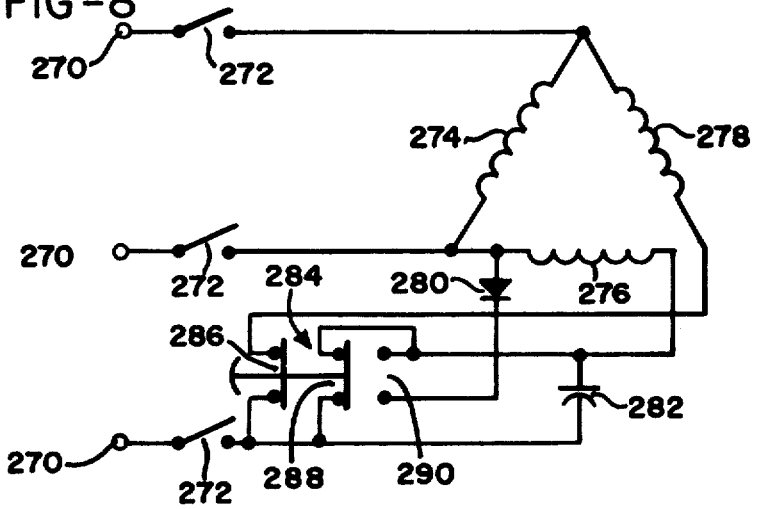

FIG. 8 of the drawings shows yet another modification of the FIG. 2 circuit which is useful in certain embodiments of the invention. The FIG. 8 circuit relates to a multiple phase motor, such as a 3-phase motor, of the type commonly employed in commercial and industrial equipment. The FIG. 8 circuit is comprised of a set of terminals 270, a three pole power switch 272, a set of motor windings 274, 276 and 278, a capacitor 282 which is selectively connected in series with one of the windings 278, a rectifier 280 and a three circuit switch 284 which includes the contacts 286, 288 and 290 and which is connected to alternately place the motor in normal operating condition or in the pulsating torque mode of operation.

When the switch 284 is in the normal position as shown in FIG. 8, the contacts 286 and 288 are closed and the motor starts and runs in the manner which is normal for a 3-phase motor. When the switch 284 is place in its alternate position, wherein only the contact 290 is closed, the capacitor 282 is placed in series with the winding 276 and the diode 280 is placed in shunt with the winding 276 in the manner which was described in FIG. 2. In this alternate position of the switch 284, the winding 274 is excited with alternating current while the winding 276 is excited with direct current to provide pulsating motor torque in the manner of FIG. 3 and FIG. 4.

The circuits of FIG. 2, 5, 6 and 8 inherently incorporate a condition wherein the voltage across the capacitor element is called upon to change quickly upon closure of a switch element. It is well known in the electrical art that closure of a low resistance electrical circuit around a charged capacitor results in large currents flowing in the capacitor and switch. Current flow during charging and discharging of the capacitors in FIGS. 2, 5, 6 and 8 can be limited if desired through the use of resistance or timing techniques which are known in the electrical art.

Although the pulsating torque apparatus of the present invention has herein been disclosed as using a manually operated control for changing the alternating current motor between the normal and the pulsating torque modes of operation, it is, of course, possible to incorporate into these apparatuses means for automatically controlling the motor either from the normal to the pulsating torque mode of operation in response to a jammed condition, or vice versa in response to relieving a jam. Such apparatus might, for example, respond to current amplitude in a motor winding or to winding temperature or to the failure of the motor to achieve normal running speed after a pre-determined interval of operation. As a jam is broken and the amplitude of the system decreases as indicated by numeral 312 in FIG. 9, appropriate sensing means may also be employed to return switch 128 to its open condition. It is also possible to employ a centrifugal switch which responds to the motor attaining the previously mentioned 93 RPM unidirectional torque velocity for transferring between the jam breaking and manual modes of motor operation.

As indicated in the foregoing specification, pulsating torque apparatus made in accordance with the present invention provides increased torque output from an alternating current motor, provides a desirable unidirectional component of torque in addition to the pulsating torque, provides a component arrangement which can easily be placed in mechanical resonance and also provides a source of mechanical vibration for shaking the entire motor and load combination. Utilization of these characteristics is made possible by the introduction of modified exciting currents into the stator windings of an alternating current motor. Each of these characteristics is found to be a desirable addition to the waste disposer environment where they provide a notably improved jam-breaking capability.

The improved jam-breaking capability of a waste disposer incorporating the pulsating torque apparatus of the present invention is illustrated by the fact that a waste disposer of the type shown in FIG. 1 has been found capable of freeing itself from the jam produced by deliberately hammering a plurality of maple dowel plugs into the tooth space between cutter wheel 130 and shredder ring 132, upon briefly activating the pulsating torque control switch. Moreover, it has also been found that a disposer of the type shown in FIG. 1 is capable of freeing itself from the jam produced by driving a 1½ inch No. 8 brass wood screw into the tooth space between cutter wheel 130 and shredder ring 132 upon repeated use of the pulsating torque control switch. Both the dowel plugs and brass screw jammed conditions are beyond the capability of any electrical, mechanical or manual jam-breaking arrangement which has heretofore been known in the disposer art.

Although the pulsating torque invention has been described in connection with a waste disposer apparatus, it is clear that pulsating torque devices may readily be applied to any type of motor load which is responsive to pulsating and vibrational torque and violent motor shaking. In particular, pulsating torque apparatus made and methods employed in accordance with the present invention can easily be applied to other forms of crushing and grinding equipment, to impact tools such as wrenches and hammers, to conveying and moving systems, etc. Anywhere that combined rotational-vibrational high torque forces are useful, this concept may have application.

While the form of apparatus herein described constitutes a preferred embodiment of the invention, it is to be understood that the invention is not limited to this precise form of apparatus, and that changes may be made therein without departing from the scope of the invention.

What is claimed is:

1. A waste disposer device comprising:

a substantially hollow cylindrical stator member;

a rotor member contained within said stator member and defining therewith a receptacle for receiving waste material, said rotor and stator members including cooperating teeth members;

means including an induction motor for driving said rotor member;

first control means for generating unidirectional rotation in said means for driving;

second control means including means for simultaneously applying alternating and direct current to said means for driving for generating rapidly fluctuating bidirectional rotational movement in said means for driving, to provide disintegrating action between said rotor and said stator members.

2. The waste disposer device of claim 1 wherein said teeth members are constructed to cut in either rotational direction.

[3. An improved jam-breaking apparatus for a waste disposer having a cutting wheel driven by an alternating current motor which includes a rotor and a multiple winding stator, said apparatus comprising:

means for urging said rotor and cutting wheel in one rotational direction in response to alternating current pulses of one polarity in windings of said multiple stator windings and in the opposite rotational direction in response to alternating current pulses of the other polarity in windings of said multiple stator windings; and means for selectively actuating said urging means.]

4. The apparatus of claim 3 wherein said means for urging includes means for generating a unidirectional magnetic field in said motor.

5. The apparatus of claim 3 wherein said means for urging includes an electrical rectifier element connected with a portion of said stator windings.

6. The apparatus of claim 3 wherein said means for urging includes both a rectifier element and a capacitor element connected with a portion of said stator windings.

7. The apparatus of claim 3 wherein said motor has at least two sets of windings on said stator and wherein said means for urging includes a capacitor connected in series with one of said winding sets and a rectifier selectively connected in shunt with said winding set.

8. The apparatus of claim 7 also including starting torque reversing means connected to selectively reverse the relative alternating current phasing between said winding sets.

[9. The apparatus of claim 3 further including means mechanically resonatable at the frequency of said urging in opposing rotational directions.]

10. In combination with a food waste disposer apparatus wherein a rotary pulverizing member is driven by a single phase squirrel cage alternating current motor having a run winding and a start winding, and wherein the start winding is series connected with a phase shifting capacitor across a source of alternating current energy, an improved static jam-breaking apparatus comprising:

means for moving said pulverizing member in fluctuating bidirectional movement including electrical rectifying means connected in shunt with said start winding, said rectifying means also excluding from said start winding current pulses of one polarity while charging said capacitor for increased current pulses of the opposite polarity in said start winding;

an electrical switch member connected with said electrical rectifying means for selectably including and removing said rectifying means.

11. The waste disposer apparatus of claim 10 wherein said rotary pulverizing member includes teeth constructed to cut in either rotational direction and further including means for connecting said start winding in opposite phase relationship each time the motor is started and for disconnecting said start winding in response to the motor attaining substantially full operating speed.

12. Apparatus for selectively generating a sequence of forward and reverse surges of rotational movement in the cutting wheel of a waste disposer apparatus comprising:

an n-phase squirrel cage rotor alternating current motor having at least a first winding and a second winding mounted on the stator thereof, the squirrel cage rotor being mechanically connected with said cutting wheel;

means for producing in said first winding an alternating current flow;

means for producing in said second winding an alternating current flow displaced in time phase with respect to current flowing in said first winding;

means for moving said rotor in rapidly fluctuating bidirectional rotation including stator winding means selectively producing in said motor magnetic poles having constant magnetic polarity with respect to polarity changes in the alternating current energy supplied to said motor, said constant poles being acted upon by magnetic flux resulting from one of said stator windings across the rotor to stator motor air gap for moving said rotor and cutting wheel in rapid bidirectional rotational movement.

13. In combination:

an alternating current electric motor having a squirrel cage rotor and a stator containing a plurality of electrical winding sets;

means for moving said rotor in rapidly fluctuating bidirectional motion including:

means for supplying alternating current electrical energy of positive and negative pulse polarities to one of said stator electrical winding sets;

means for applying direct current electrical energy including one alternating current pulse polarity and excluding the other alternating current pulse polarity to a second of said stator electrical winding sets.

14. The apparatus of claim 13 including selective means limiting the application of said direct current electrical energy to said second winding set for moving said rotor in rapid bidirectional fluctuations to instances wherein said rotor member has a velocity substantially below the normal running speed of said motor.

15. The apparatus of claim 13 including means for increasing the amplitude of the current pulses applied to said second electrical winding set with respect to the alternating current pulses applied to the first electrical winding set.

[16. A method for producing rotational oscillations in an induction alternating current motor comprising:

connecting alternating current energy to a first set of electrical windings located at a plurality of first stator pole locations in said motor, and simultaneously applying direct current energy to a second set of electrical windings located at a plurality of second stator pole locations in said motor, commencing said applying with the rotor of said motor in a substantially static condition.]

[17. The method of claim 16 wherein said direct current energy is undulating in nature and wherein said undulating is synchronized with said alternating current energy to provide unidirectional rotation of said rotor in addition to said rotational oscillation.]

[18. The method of claim 16 further including the step of:

coupling said motor to a rotational vibration-responsive mechanical load.]

19. The method of claim [18] *47* wherein said rotational vibration-responsive mechanical load is mechanically resonatable.

[20. The method of claim 16 wherein the rotor of said motor is at first mechanically restrained and is gradually released from restraint by said rotational vibration and wherein said rotor undergoes a period of mechanical resonance in the course of said gradual release.]

[21. A method for operating a squirrel cage rotor induction alternating current motor comprising:

generating in the stator of said motor a plurality of time-varying alternating current magnetic poles;

inducing magnetically in the rotor of said motor a plurality of unidirectional magnetic poles, and coupling said motor to a rotational vibration-responsive mechanical load.]

[22. The method of claim 21 wherein said step of inducing magnetically in the squirrel cage rotor a plurality of unidirectional magnetic poles includes generating in the stator a plurality of fixed polarity magnetic poles and magnetically coupling flux from said stator poles into the rotor.]

[23. In combination:

an alternating current induction motor having a stator member with a plurality of electrical winding sets and a rotor member;

means for urging said rotor in rapidly alternating bidirectional rotational strokes from a starting position including:

means supplying alternating current electrical energy to one of said stator electrical winding sets for generating alternating stator magnetic flux;

means supplying direct current electrical energy to a second of said stator electrical winding sets for generating non-reversing stator magnetic flux;

the non-reversing and alternating stator magnetic fluxes cooperating to urge the rotor in bidirectional rotational strokes from a starting position.]

[24. The apparatus of claim 23 further including means selectively replacing said direct current electrical energy in said second stator winding set with alternating current energy of positive and negative pulse polarities for accelerating and running said motor at normal induction motor speed.]

25. The apparatus of claim [24] *49* further including means inhibiting the application of said direct current electrical energy at rotor speeds near said normal speed.

[26. The apparatus of claim 23 wherein said non-reversing stator magnetic flux is at least equal in quantity to said alternating magnetic flux.]

27. The apparatus of claim [26] *50* further including means for increasing the quantity of said non-reversing flux.

[28. The apparatus of claim 23 wherein said direct current electrical energy and said non-reversing stator magnetic flux are undulating in nature;

undulating flux adding a component of unidirectional motion to the alternate rotational movement of said rotor member.]

[29. The apparatus of claim 28 further including electrical rectifying means for generating said undulating electrical energy from the source of said alternating current energy.]

[30. Oscillatory apparatus comprising:

an alternating current induction motor having adjacently mounted stator and squirrel cage rotor members initially in the quiescent state;

means for generating in a portion of said stator member alternating polarity magnetic flux which acts on said rotor member;

means for generating in a portion of said stator member a quantity of non-reversing polarity magnetic flux sufficient, in cooperation with said alternating polarity flux, to move said rotor member in rapidly alternating rotational oscillations.]

[31. A method for operating an alternating current induction motor comprising:

establishing with one stator winding an alternating polarity magnetic flux coupling the motor stator and rotor members;

generating with another stator winding a quantity of non-reversing magnetic flux sufficient, when cooperative with said alternating polarity flux, to move the rotor member in rapid small amplitude rotational oscillations.]

[32. The apparatus of claim 3 wherein said alternating current motor is an induction motor and includes squirrel cage windings on said rotor member.]

[33. Apparatus for generating oscillating bidirectional motion comprising:

an alternating current induction motor having a squirrel cage rotor and a stator containing a plurality of electrical winding sets;

means for supplying alternating current electrical energy of positive and negative pulse polarities to one of said stator electrical winding sets;

means including a rectifier element connected in parallel with said second of said electrical winding sets for applying direct current electrical energy including one alternating current pulse polarity and excluding the other alternating current pulse polarity to a second of said electrical winding sets;

means including a capacitor element connected in series with the parallel combination of said rectifier and second electrical winding set for increasing the amplitude of current pulses applies to said second of said electrical winding sets.]

34. In combination:

an alternating current induction motor having a stator member with a plurality of electrical winding sets and a rotor member;

means for urging said rotor in bidirectional rotational strokes from a starting position including:

means supplying alternating current electrical energy to one of said stator electrical winding sets for generating alternating stator magnetic flux;

means supplying direct current electrical energy to a second of said stator electrical winding sets for generating non-reversing stator magnetic flux; and, means replacing said direct current electrical energy with alternating current energy in said second winding set for accelerating said rotor to near synchronous rotating speed in response to decreased motor load.

35. In combination:

an alternating current induction motor having a stator member with a plurality of electrical winding sets and a rotor member;

means for urging said rotor in bidirectional rotational strokes from a starting position including:

means supplying alternating current electrical energy to one of said stator electrical winding sets for generating alternating stator magnetic flux;

means supplying direct current electrical energy to a second of said stator electrical winding sets for generating non-reversing stator magnetic flux;

means replacing said direct current electrical energy with alternating current energy in said second winding set for accelerating said rotor to near synchronous rotating speed in response to decreased motor load; and, means for reversing the direction of rotor rotation each time said means for accelerating is used.

[36. In combination:

an alternating current induction motor having a stator member with a plurality of electrical winding sets and a rotor member;

means for urging said rotor in bidirectional rotational strokes from a starting position including:

means supplying alternating current electrical energy to one of said stator electrical winding sets for generating alternating stator magnetic flux;

means supplying direct current electrical energy to a second of said stator electrical winding sets for generating non-reversing stator magnetic flux; and, means rotationally mechanically resonant at the frequency of said bidirectional rotational motion.]

*37. Waste disposer apparatus comprising inlet and outlet means for waste material, rotary grinding means for grinding said waste material during passage through said apparatus, an alternating current motor including a rotor coupled to said rotary grinding means and first and second windings for causing rotation of said rotor and said grinding means, connecting means for connecting said first and second windings to a source of alternating current; and power conversion means including rectifying means for converting said alternating current into pulsed direct current and switch means for selectively applying said pulsed direct current to said second winding and causing generation of a pulsed unidirectional jam breaking torque.*

*38. Apparatus according to claim 37 wherein said power conversion means removes alternating current from said second winding when said pulsed direct current is applied thereto.*

*39. Apparatus according to claim 38 wherein said rectifying means are connected in series with said switch means and with a capacitor and further wherein said second winding is connected in parallel with the series combination of said rectifying means and said switch means.*

*40. Apparatus according to claim 39 wherein said motor is a single phase alternating current motor with said first winding being connected as a run winding and said second winding being connected as a start winding.*

*41. Apparatus according to claim 40 wherein control means are provided for disconnecting said second winding from said connecting means in response to a predetermined operating condition of said motor and reestablishing said*

*connection when said apparatus is energized from a deenergized condition.*

*42. Apparatus according to claim 41 wherein said control means reverses the connection of said second winding to said connecting means each time said connection is reestablished.*

*43. Apparatus according to claim 40 wherein said motor comprises a squirrel cage winding on said rotor and a stator including said first and second windings.*

*44. Apparatus according to claim 43 wherein said second winding is connected to said connecting means in parallel with said first winding.*

*45. Apparatus according to claim 39 wherein said motor is a three phase alternating current motor with said first and second windings being connected for different phase operation.*

*46. Waste disposer apparatus comprising means defining a receptacle for waste material to be ground by said apparatus and including a set of stationary cutting teeth, inlet and outlet means for said receptacle, a cutting wheel mounted in said receptacle and equipped with cutting wheel teeth for cooperating with said stationary cutting teeth to grind waste material passing through said receptacle from said inlet means to said outlet means, an alternating current motor including a rotor mechanically coupled to said cutting wheel and a stator magnetically coupled to said rotor, first and second windings wound on said stator for causing rotation of said rotor, connecting means for connecting said first and second windings to a source of alternating current, rectifying means for receiving alternating current from said connecting means and converting said alternating current into pulsed direct current, and switch means for removing said alternating current from said second winding and substituting said pulsed direct current therefor during conditions when said cutting wheel has become jammed, said substitution causing application to said cutting wheel of a fluctuating bidirectional torque having a net unidirectional component.*

*47. A method for producing rotational oscillations in an induction alternating current motor comprising:*

*connecting alternating current energy to a first set of electrical windings located at a plurality of first stator pole locations in said motor,*

*simultaneously applying direct current energy to a second set of electrical windings located at a plurality of second stator pole locations in said motor, commencing said applying with the rotor of said motor in a substantially static condition, and*

*coupling said motor to a rotational vibration-responsive mechanical load.*

*48. A method for producing rotational oscillations in an induction alternating current motor comprising:*

*connecting alternating current energy to a first set of electrical windings located at a plurality of first stator pole locations in said motor, and*

*simultaneously applying direct current energy to a second set of electrical windings located at a plurality of second stator pole locations in said motor, commencing said applying with the rotor of said motor being at first mechanically restrained in a substantially static condition and being gradually released from restraint by rotational vibration accompanying a period of mechanical resonance.*

*49. In combination:*

*an alternating current induction motor having a stator member with a plurality of electrical winding sets and a rotor member;*

*means for urging said rotor in rapidly alternating bidirectional strokes from a starting position including*

*means supplying alternating current electrical energy to one of the said stator electrical winding sets for generating alternating stator magnetic flux,*

*means supplying direct current electrical energy to a second of said stator electrical winding sets for generating non-reversing stator magnetic flux, and*

*means selectively replacing said direct current electrical energy in said second stator winding set with alternating current energy of positive and negative pulse polarities for accelerating and running said motor at normal induction motor speed;*

*the non-reversing and alternating stator magnetic fluxes cooperating to urge the rotor in bidirectional rotational strokes from a starting position.*

*50. In combination:*

*an alternating current induction motor having a stator member with a plurality of electrical winding sets and a rotor member; and*

*means for urging said rotor in rapidly alternating bidirectional rotational strokes from a starting position including:*

*means supplying alternating current electrical energy to one of said stator electrical winding sets for generating alternating stator magnetic flux, and*

*means supplying direct current electrical energy to a second of said stator electrical winding sets for generating non-reversing stator magnetic flux;*

*the non-reversing stator magnetic flux being at least equal in quantity to said alternating magnetic flux and both magnetic fluxes cooperating to urge the rotor in bidirectional rotational strokes from a starting position.*

* * * * *